United States Patent
Ramsauer et al.

(10) Patent No.: US 8,265,781 B2
(45) Date of Patent: Sep. 11, 2012

(54) MONITORING UNIT FOR A DEVICE FOR MANIPULATING CONTAINERS

(75) Inventors: Stefan Ramsauer, Regensburg (DE); Peter van den Tol, Rosenheim (DE)

(73) Assignee: Krones AG (DE)

( * ) Notice: Subject to any disclaimer, the term of this patent is extended or adjusted under 35 U.S.C. 154(b) by 541 days.

(21) Appl. No.: 12/447,252

(22) PCT Filed: Oct. 12, 2007

(86) PCT No.: PCT/EP2007/008865
§ 371 (c)(1), (2), (4) Date: Sep. 28, 2009

(87) PCT Pub. No.: WO2008/049518
PCT Pub. Date: May 2, 2008

(65) Prior Publication Data
US 2010/0016997 A1    Jan. 21, 2010

(30) Foreign Application Priority Data

Oct. 24, 2006 (DE) .......................... 10 2006 049 981
Oct. 27, 2006 (DE) .......................... 10 2006 051 533

(51) Int. Cl.
*G05B 15/00* (2006.01)
*G06F 3/14* (2006.01)

(52) U.S. Cl. .......... 700/83; 700/108; 700/213; 715/700; 715/965

(58) Field of Classification Search ................... 700/17, 700/28–32, 65, 66, 83, 95–97, 108–110, 700/213, 228; 715/700, 733–737, 771, 961, 715/965, 969, 970
See application file for complete search history.

(56) References Cited

U.S. PATENT DOCUMENTS

| | | | |
|---|---|---|---|
| 6,226,760 B1 | 5/2001 | Burkhardt et al. | 714/33 |
| 6,289,299 B1 * | 9/2001 | Daniel et al. | 703/21 |
| 6,718,215 B2 | 4/2004 | Friedrich et al. | 700/65 |
| 6,889,096 B2 * | 5/2005 | Spriggs et al. | 700/17 |
| 6,892,107 B2 * | 5/2005 | Baba et al. | 700/108 |
| 7,054,793 B2 * | 5/2006 | Moritz et al. | 703/1 |
| 7,092,771 B2 * | 8/2006 | Retlich et al. | 700/72 |
| 7,103,506 B2 * | 9/2006 | Friedrich et al. | 702/184 |
| 7,340,086 B2 | 3/2008 | Werzinger | 382/142 |
| 7,715,929 B2 * | 5/2010 | Skourup et al. | 700/17 |
| 8,023,500 B2 * | 9/2011 | Thibault et al. | 370/386 |
| 8,028,272 B2 * | 9/2011 | Eldridge et al. | 717/110 |

(Continued)

FOREIGN PATENT DOCUMENTS

CN    1360686    7/2002

(Continued)

*Primary Examiner* — M. N. Von Buhr
(74) *Attorney, Agent, or Firm* — Hayes Soloway P.C.

(57) ABSTRACT

A device for manipulating containers, comprising a manipulation unit manipulating the containers in a predetermined manner, this manipulation unit including at least one condition detection unit which detects at least one operating condition of the manipulation unit and sends out condition signals which are characteristic for this operating condition of the manipulation unit, and including a monitoring unit for monitoring the manipulation unit, the monitoring unit including a visual display device for displaying information as well as a storage device in which presentation data for components of the manipulation unit is deposited. According to the invention, the monitoring unit includes an image manipulation unit which as a response to emitted condition signals provides image sequences on the basis of presentation data stored on the storage device, which image sequences may be output via the display device.

14 Claims, 3 Drawing Sheets

U.S. PATENT DOCUMENTS

| | | | |
|---|---|---|---|
| 2002/0075244 A1* | 6/2002 | Tani et al. | 345/173 |
| 2007/0163697 A1 | 7/2007 | Kursawe | 156/64 |
| 2007/0179641 A1* | 8/2007 | Lucas et al. | 700/83 |

FOREIGN PATENT DOCUMENTS

| | | | |
|---|---|---|---|
| DE | 197042 446 | | 4/1999 |
| DE | 199 00 884 | | 7/2000 |
| DE | 100 49 021 | | 4/2002 |
| DE | 100 65 321 | | 7/2002 |
| WO | WO 00/02162 | * | 1/2000 |
| WO | WO 00/07079 | * | 2/2000 |
| WO | WO 01/67195 | | 9/2001 |
| WO | WO 2005/068301 | | 7/2005 |
| WO | WO 2007/082575 | * | 7/2007 |

* cited by examiner

MONITORING UNIT FOR A DEVICE FOR MANIPULATING CONTAINERS

BACKGROUND OF THE INVENTION

The present invention relates to a device for manipulating containers. Particularly in the beverage production industry, the most varied devices for manipulating containers are used. By way of example, labeling machines, stretch-blow moulding machines, packaging machines for packing containers into outer packaging, devices for producing outer packaging and the like may be mentioned.

Such machines are usually delivered to consumers in low quantities and are frequently individually tailored to their particular needs. The respective consumers have to be able to operate the machines in a safe manner and to carry out, for example, product changes in a safe manner or to handle faults on their own. More accurately, the operating personnel have to be supported during the performance of certain activities on the machine, in order to enable them to work safely and efficiently. From the prior art there are, for example, known systems which detect malfunctions or faults on the machine or the machine process, stop the machine as a result and indicate to the operating personnel that a fault is present. However, finding the fault often is a laborious and time-consuming task. In order to actually correct the fault, the user normally has a printed instruction manual at his/her disposal, from which (s) he can find out how to correct the fault or which steps are to be taken to do so.

Also in the case of a product change, which means a conversion of the equipment that has become necessary, reference is usually made to an instruction manual which explains the individual steps for conversion. However, not in every case of converting from a first product type A to a second product type B, all the components involved will have to be changed, but often just a few steps are needed to convert the respective machine. In this case it may thus occur that the user carries out a great number of unnecessary steps, since the machine has already been converted to some degree.

SUMMARY OF THE INVENTION

The present invention is therefore based on the object of simplifying the operation of devices for manipulating containers, in particular in the beverage industry. In doing so, the various components and opportunities for improving the self-descriptiveness of the machine are intended to be improved by means of a test environment. In particular, user friendliness with regard to product changes to be carried out, with regard to fault visualisation and fault correction as well as with regard to maintenance is supposed to be improved.

The device according to the invention for manipulating containers includes a manipulation unit manipulating the containers in a predetermined manner. Such a manipulation unit comprises at least one condition detection means which detects an operating condition of the device and which may be used to send out condition signals that are characteristic for this operating condition of the manipulation unit. Moreover, a monitoring unit for monitoring the manipulation unit is provided, the monitoring unit including a visual display device for displaying information, as well as a storage device on which presentation data for components of the manipulation unit is stored.

According to the invention, the monitoring unit has an image manipulation unit which provides images and/or image sequences as a response to emitted condition signals on the basis of presentation and flow data stored in the storage device, which may be output via the display device.

The containers may be in particular, but without limitation, bottles, receptacles, boxes and the like. A manipulation unit is understood to be any unit which acts on the containers in a predetermined manner, for example a device for labelling the containers, a device for filling the containers, a production device, in particular for stretch-moulding the containers, a device for packing containers and the like.

An operating condition of the device is understood to be, on the one hand, a fault condition of the device, such as overheating, excessive pressures and the like. Apart from that, however, an operating condition is also understood to be a certain actual condition of the machine, for example whether or not a receptacle is present in a neck handling clamp, or a poorly positioned receptacle. Apart from that, operating conditions may also be actual positions of the machine, such as for example the actual position of a screw conveyor, a conveyor belt, a gripper or the like, which correspond to a certain kind of container, or the operating time or the wear condition of a drive element.

Correspondingly, a condition detection device may be a device which detects for example an excessively high operating temperature or excessively high operating pressures or leaking liquids. In addition, the condition detection device may also be a device which detects for example an opening condition of a door, of a safety cover or the like. In addition, the condition detection device may also be a device which detects a current operating position of the device or of a component of the device, for example a rotational position of a screw conveyor or the operating time of the device or the number of containers manipulated.

A monitoring unit is understood to be any unit which communicates with the device for manipulating containers and which allows at least one operating condition of the device to be monitored. In addition, this monitoring unit is particularly preferably also implemented as a monitoring unit for controlling and/or operating the manipulation unit. Monitoring is preferably also carried out on the basis of the condition signals emitted by the condition monitoring device.

Presentation data is understood to be any data describing the respective components of the manipulation unit, the manipulation unit, the components of the device as well as the device. In here, this is particularly image data allowing the respective component to be graphically displayed on the display device. An image manipulation unit is understood to be a device which is able to modify the image displayed on the basis of the presentation data and which allows for example the image to be rotated in a 3-D format, certain areas to be zoomed and the like. This image manipulation unit preferably generates image sequences on the basis of the presentation and flow data stored in the storage device, for example in order to allow the user to view a presented object from several sides or to rotate it spatially. In addition, the image manipulation unit may also generate image sequences on the basis of an image, which image sequence will give flow instructions to the user, for example as to how to correct a fault.

In addition, the image manipulation unit can also generate instructions for any product changes or motion sequences of the machines in an animated form.

The measures mentioned enhance the self-descriptiveness and the process reliability of the respective machine and thus also reduce the training needs for the machines and systems according to the invention. In addition, also the machine-specific training needs will be substantially reduced and intuitive operability will be enabled even for less well trained personnel.

The presentation data is preferable stored in the storage device in the form of vector graphics. A vector graphic is a two- or three-dimensional computer image made up of graphical primitives such as lines, circles and polygons. Unlike raster graphics, such vector graphics may be scaled and skewed in a continuously variable manner without any loss in quality, for example by means of homogenous coordinates. In principle, it would also be conceivable to store the respective graphics in the storage device in the form of images (such as bitmaps) or films. In this case, however, the storage capacity needs for the storage device would be very high. By using vector graphics, the storage capacity need may be considerably reduced. Moreover, on the basis of vector graphics having considerably lower storage capacity needs, it becomes possible to generate image sequences. For example, in the case of a fault on a component it is possible to indicate this component and also to indicate the steps to be taken to correct the fault.

Preferably, images of individual components of the machines, the device, the environment etc. are stored on the storage device in a simplified form. The basis used for generating this image data is preferably a full 3-D model. This model includes a geometrically exact picture of the component, which may be obtained for example from CAD documents. This full model requires, however, very high storage capacities and is therefore not practical for handling. Also, the user of the machine will get confused by such a full model due to the often dense clustering of details. Therefore, the images of the components are preferably stored in a simplified form, whilst for example any partial areas of the respective component, which are irrelevant to the user, are omitted. In this way, a storage space reduction of up to or even more than 99% may be achieved. Therefore it is also possible to provide the respective monitoring unit with relative low storage resources and it is in particular not necessary to provide expensive storage media such as for example CD ROM drives.

It is also possible by means of the image manipulation device to simply generate or indicate a sequence or motion sequence on the basis of the simplified image data.

Preferably, image sequences are stored in the storage device. Hence it is possible to select a certain image sequence on the basis of a given condition signal and to output the same via the display device.

It is particularly preferred to store flow data in the storage device. By means of this flow data, which is basically a "script", the image manipulation unit can, on the basis of a given condition signal and the presentation data stored on the storage device, generate a certain image sequence and output this via the display device. In this way, there is no need to deposit an image sequence for each conceivable condition of the device on the storage device, but just a schedule, i.e. the "script". The image sequence shown will be generated anew by the image manipulation unit each time it is invoked. In this way, the storage capacity need of the storage device will be considerably reduced.

In a further advantageous embodiment, a plurality of condition detection devices is provided. These are preferably selected from a group consisting of temperature sensors, switches, pressure sensors, sensors for determining the position or the type of component such as shafts or motors, sensors for determining an occupancy condition of a component and the like.

The operating conditions are, as mentioned above, selected from a group of operating conditions including fault conditions, product change conditions, fault conditions of the condition detection devices, actual conditions, required conditions and the like.

In a further advantageous embodiment, operating conditions of the manipulation unit are stored on the storage device. Thus, for example, it may be stored how for a certain product the individual components of the manipulation unit are set. If a change to another product takes place now, it may not be necessary to change all of the conditions, but it may be possible to keep some operating conditions unchanged. In this case, only those conditions will be indicated to the user that need to be changed, or only those steps are indicated to the user that need to be taken for the product change from a product A to a product B to be carried out in each case.

The present invention further relates to a monitoring unit particularly for controlling and/or operating a device of the kind described above. Such a monitoring unit includes a visual display device for displaying information as well as a storage device having stored thereon presentation data for components of the device or of a manipulation unit of the device as well as flow data. According to the invention, the monitoring unit has an image manipulation unit which on the basis of presentation and flow data stored in the storage device generates image sequences that can be output via the display device. In this case, the monitoring unit according to the invention may be used without any direct contact or without any connection with the machine to be controlled, i.e. offline. In this case, the monitoring unit may also serve as an operating aid for the user and may provide the user for example with relevant data for the machine to be connected in each case. Thus, for example, the user may select certain components of the machine and may obtain information on these modules through image sequences, for example on the installation, their specifications, maintenance and the like.

The image sequences may preferably be output on the basis of an actual condition of the device. In this case, it is particularly preferred if a communication link is provided between the machine and the monitoring unit, and the actual condition of the machine will be determined here for example on the basis of motor positions, sensor signals and the like and will be output to the monitoring unit. The monitoring device is preferably designed in the manner described above and in particular the presentation data is stored on the storage device in the form of vector graphics.

The present invention further relates to a method of operating a device for manipulating containers. It is preferred therein that in a first step, the device for manipulating containers sends out a characteristic signal to a monitoring unit of the device. However, the characteristic signal may also be initiated by a user. The latter case may for example occur in the case of a product change wherein the user will acknowledge a process that has already been carried out. In a further step, a specified presentation data set or several specified presentation data sets out of a plurality of presentation data sets deposited in a storage device is/are selected, the data set or data sets being characteristic for at least one component or for a part of the components of the device and the selection is made in response to the characteristic signal. Finally, an image sequence will be generated and/or output in response to the characteristic signal and on the basis of the selected presentation data set or the selected presentation data sets. In this connection it is also possible that the image sequence will only be generated as a response to an additional input by the user, for example upon an input instruction to rotate a certain image or to zoom it closer. Therefore, an image sequence is understood to be individual images which are transmitted in sequence and which show for example a module from different perspectives. However, the sequence may also be an instruction to the user.

The characteristic signal is preferably a signal which is characteristic for an operating condition of the device, i.e. in particular a signal which is characteristic for a movement or fault condition of the device.

The image sequence is preferably output in a 3-D presentation. This means that the display device displays the respective modules in a three-dimensional form and will particularly also allow the modules to be rotated in a three-dimensional form.

In a further preferred process, instructions for reaching a required condition of the device will be output to a user in the form of image sequences. In this connection, for example an actual condition or a fault condition of the machine may be used as the basis, and the individual steps necessary to correct the fault will be indicated in the form of image sequences. It is particularly preferred if text information is omitted, in order to avoid the costly translation of different instructions into other languages. Also in the case of a product change or of a conversion or a maintenance procedure, instructions may be output to a user via the image sequences mentioned, for example instructions like "Opening of a security door", "Removing of a product", "Inserting of a format component", "Exchanging of a filter", "Topping up of a lubricant", "Changing of a bearing bush" and the like.

The instructions are preferably given on the basis of an actual condition of the device. Thus it is possible to show to the user for example in the case of a product change, which steps actually have to be carried out in order to achieve the product change.

In a further preferred method, any instructions already carried out are saved. This provides a reliable way of checking at what stage of a product change or of checking a fault the user is.

In addition, text information may be given to the user. In addition to that it is also possible to send out acoustic signals or to stop the respective machine in the case of a fault condition.

BRIEF DESCRIPTION OF THE DRAWINGS

Further advantages and embodiments will become evident from the attached drawings, wherein.

DETAILED DESCRIPTION

Figure 1:
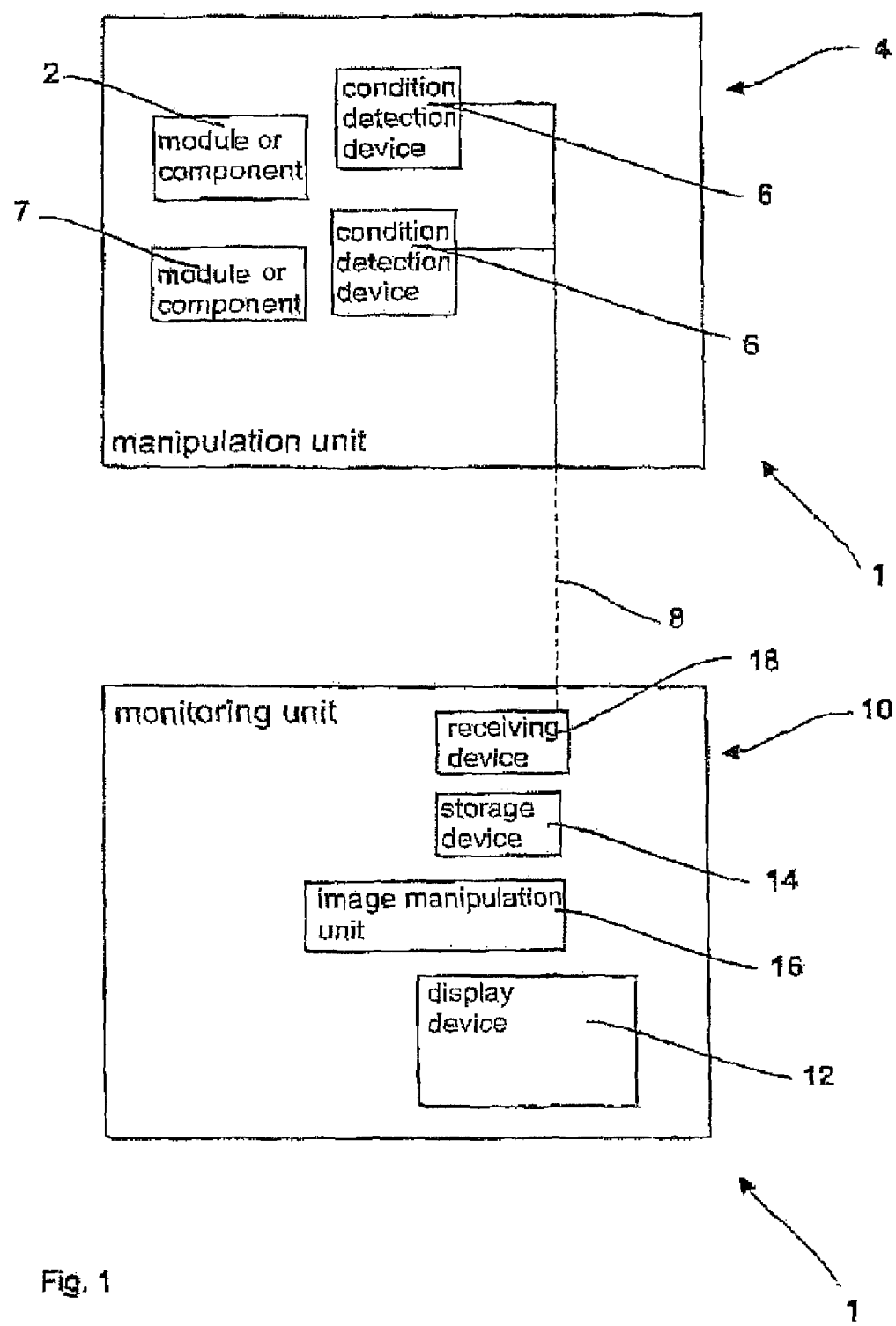
FIG. 1 shows a block diagram of a device according to the invention.

FIG. 1 shows a block diagram of a device 1 according to the invention for manipulating containers. This device 12 comprises a manipulation unit 4 for manipulating containers. This manipulating unit may, for example, be a labelling machine. The manipulation unit includes herein a plurality of individual modules or components, of which, however, only two components 2, 7 are shown. A component may e.g. also be a part not directly operatively connected to the machine, such as e.g. a conversion parts trolley with spare parts. Those two components each have a condition detection device 6 allocated to them, which detects an operating condition of the component or also of the manipulation unit 4 as a whole.

The condition detection devices 6 send out signals to the monitoring unit 10 via a communications link 8, which signals correspond to corresponding operating conditions of the manipulation unit 4 or the components 2, 7. The communications link 8 may be a cable connection, but also a wireless connection such as for example a radio connection, an infrared connection or the like. Thus it is possible to accommodate the monitoring unit also in a room separated from the monitoring unit 4 or at more remote locations. The monitoring unit 10 is provided here as a "touch panel" or includes one or several "touch panels".

The monitoring unit 10 includes a display device 12 which allows the machines and/or systems or individual modules such as the components 2, 7 to be visualized. Thus, the monitoring unit 10 is provided via the communications link 8 with up-to-date data, for example of a conversion process or an operating condition of the manipulation unit 4. The signals are received by a receiving device 18 of the monitoring unit 10. By means of this data, instructions may be output to a user. In doing so, the currently deposited data from the visualisation, for example current operating conditions of the manipulation unit 4 as well as the actually necessary working steps (in the form of deposited product logic) are displayed to the user. This enables efficient working practices and avoids any unnecessary steps, for example during a product change process. Any steps already completed are forwarded to a higher-level system (e.g. ERP, MES) and are saved.

The presentation data for the two components 2 and 7 and for further components of the manipulation unit 4 as well as for any components not directly connected to the manipulation unit 4 is stored in a storage device 14. In addition, the storage device holds flow data, i.e. a kind of "script", for the sequence of images or positions of images to be displayed. An image manipulation unit 16 can access this stored data and can generate images or image sequences from the presentation data stored as well as from the flow data. These image sequences are subsequently output on the display device 12. The image sequences may, however, also already be deposited on the storage device and may be retrieved on demand.

Figure 2A:
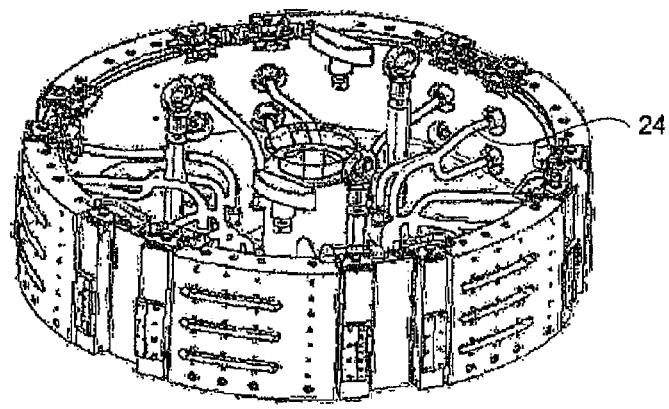
FIGS. 2a-2c show illustrations to explain the image storage.
Figure 2B:
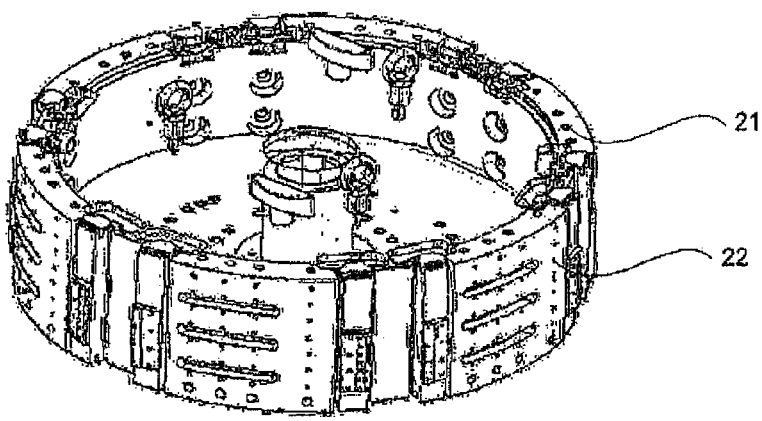
Figure 2C:
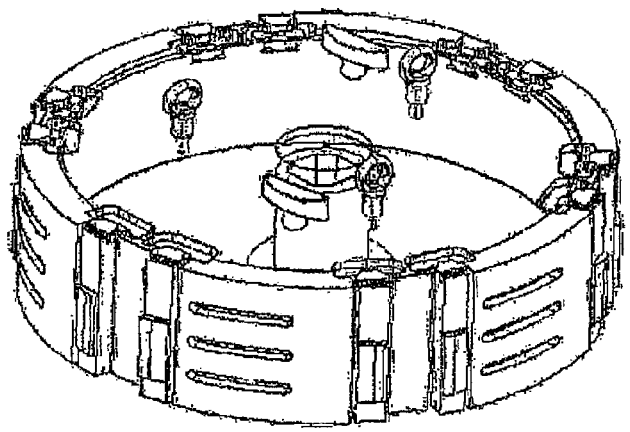

FIGS. 2a-2c illustrate how the individual presentation data elements are stored on the storage device. In order to save on storage space, the presentation data is deposited on the storage device 14 in the form of a VRML model. VRML (Virtual Reality Modelling Language) is a description language for 3-D scenes, their geometries, illuminations, animations and possibilities for interaction.

Such a VRML presentation may be generated by the viewer's PC in real time. This means that the PC may continuously recalculate each individual image from the present geometry data as well as from the behaviour and the movements. Thus, owing to the VRML models deposited in each case, it is possible to generate 3-D presentations of entire objects. Compared with this, FIG. 2a shows a so-called full model with geometrically exact module pictures, a constructive layout of the modules and accurately presented geometries.

The VRML model shown in FIG. 2c shows a three-dimensional presentation of this object shown in FIG. 2a with reduced geometries. This model nonetheless allows concrete contents or functionalities of the displayed module to be communicated, and the model shown herein is a module of a labelling machine. In addition, a system layout or mounting procedures may be communicated via the VRML model. In addition, the model enables simple interaction or navigation and, finally, inter-process use is also possible.

Thus, the object shown in FIG. 2c or the data thereof serves as a communication aid. In detail, starting from the full model shown in FIG. 2a, individual parts which are less relevant to the user are initially hidden. More accurately, the amount of detail of the 3-D geometry will be reduced when illustrating the machine. To this end, above all standard parts such as e.g. screws, washers, the tubes 24 and also any construction details which are not visible from the outside and which are not necessary for the conversion process or the correction of the fault will be eliminated from the model. The implementation of these steps will take place in the 3-D CAD system used, since this is provided with the corresponding functionalities. In addition, by blanking out these details, also the protection of proprietary know-how may be ensured.

The aim of this working step is the generation of a 3-D model of the machine which is complete in so far as it depicts the required functionality, but which is at the same time manageable. This already allows a reduction of the data volume to be achieved. In the second transition of FIG. 2b to FIG. 2c, as mentioned above, the geometries are simplified and thus the picture is output in FIG. 2c as a simplified simulation model. Thus, for example, the illustrations of the bores 21 on the upper edge or the openings 22 may be omitted when the simulation model is generated. More accurately, the processed data will be converted from the 3-D CAD in a further step. The transported data is imported into the VR software and is edited with regard to its external appearance. To this end, the colours or textures of the various modules and their illuminations are to be determined. It is also possible to create animations.

By means of the procedure shown in FIGS. 2a-2c, the storage space needed for the respective models may be reduced by up to 99% or more.

Figure 3:
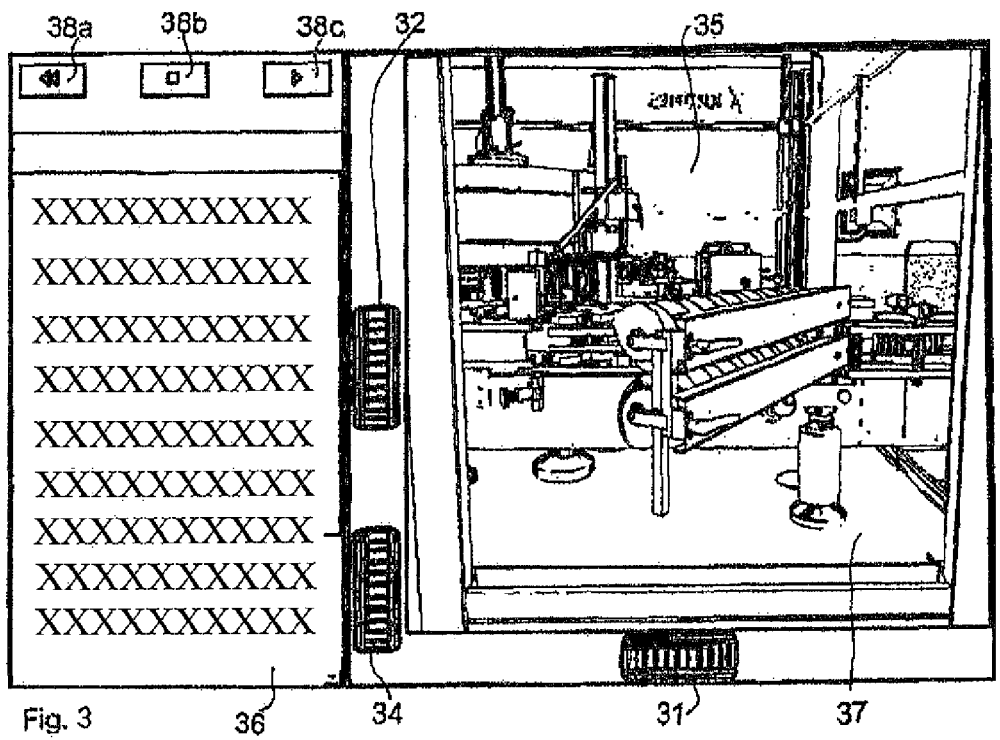
FIG. 3 shows a diagram to illustrate the procedure in the case of a product change.

FIG. 3 shows the display device 12 or the screen display thereof in the case of a product change. Herein, a certain machine part or a module is shown in the right-hand partial image 37 or the main window 35, on which for example a product change is supposed to be carried out. This is done to visualise how a machine needs to be converted from one product (e.g. a 0.5 l bottle) to another product (e.g. a 1.0 l bottle). This visualisation in the main window 35 acts as an interactive guide for the user and shows all the necessary steps of a product change by means of animated 3-D models and symbols. Preferably, no text is used so that no translations are needed and it is totally unimportant which languages the respective user knows. Ideally, only the necessary steps should be instructed in each case. Preferably, data may be inserted which have to be set in certain places (required value). Thus, in the case of product changes, distances or heights often have to be set by means of spindles. On or next to the spindles, the actual values may be provided, in order to assist the user in the conversion. However, it is also possible to insert the actual values of certain components.

Particularly preferably, animation is implemented on the monitoring unit 10 or its visualisation system. In addition, this visualisation system is also linked with the machine control. This implementation is made possible by virtue of the fact that the data volumes for the animations to be displayed in each case are kept small.

In detail, the information may thus be called up on site on the machine. The animations may, however, also be used as training materials and may be used, for example, on Windows computers in stand-alone operation, i.e. independent from the manipulation unit.

In the embodiment shown in FIG. 3, the display device has two operating devices 31 and 32, which may be used to rotate the image 37 shown about two axes or the x and the y axis and may thus be viewed three-dimensionally from different sides. These operating devices may be actually existing switches or they may be graphic representations of implemented operating devices, such operating devices being activated by touching the display device 12.

More precisely put, an actuation of the operating devices 31 and 32 will trigger the flow of image sequences.

A further operating device 34 allows the image presented in the main window 35 to be enlarged or reduced. In this connection it is possible that the image shown in the main window 35 will reproduce in an animated way the actual current operation of the manipulation unit 4. In doing so, it is possible to generate the image to be presented in each case for example on the basis of control data from the manipulation unit, to derive, for example from a certain motor position, the position of a unit driven by this motor and/or from sensor signals, and to present a correspondingly animated image.

In the animated illustration it is also possible to look behind certain components or to remove them.

This enables an actual monitoring of a process of the manipulation unit to be carried out. For example, in the left-hand secondary window 36, a guide for a product change may be given via textual information. For this purpose, an actual condition or a starting position is known to the system. The secondary window 36 shows a plurality of modules necessary for a certain product change. The image shown in the main window 37 and the image shown in the secondary window 36 correspond to each other. For example, it is possible that, as shown in FIG. 3, three modules have already been changed or adapted and this has already been identified accordingly in the secondary window 36. As soon as the user has made any changes to the bottom screw conveyor of the actual machine and these changes are recognized as being correct, this step, too, will be identified as completed in the secondary window 36. Thus, this illustration may give to the user an easily comprehensible guide for replacing certain components. Since an actual condition of the machine has been saved and the system knows which required condition is to be achieved during a certain product change, it may also be indicated to the user on which components no modifications are necessary for a certain change.

By using the actuation fields 38a, 38b, 38c, a simulation in the main window 37 may be stopped (actuation field 38b), played in reverse (actuation field 38a) or may be played on (actuation field 38c).

Figure 4:
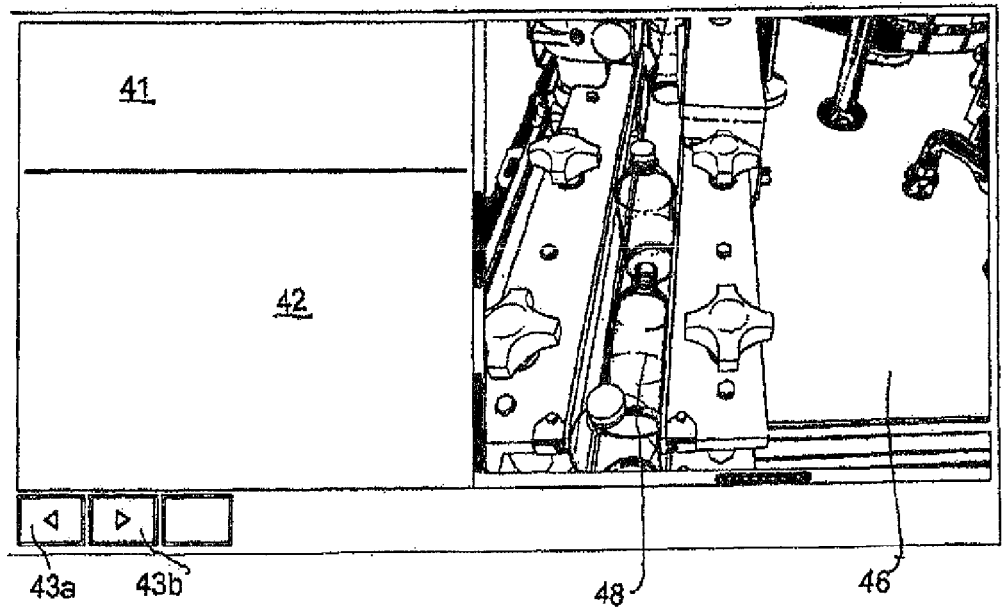
FIG. 4 shows a diagram to illustrate the procedure in the case of correcting a fault.

FIG. 4 shows a further example for a display in the display device 12 in the case of a fault occurring. In this case, certain fault messages are output in a communication window 41, which may for example report that a machine fault is present in the inlet section (fault localisation). In addition, also the exact location of the fault, such as for example the inlet section, as well as the correction thereof may be indicated. In an information field 42, a more accurate description of the fault may be given, such as for example the message that a light barrier has detected a container in a lying position or a gap in the machine process.

On the basis of this condition information, certain measurement data sets are retrieved from the storage device 14 and the image shown in the main window 46 is output via the image manipulation unit 16. Correspondingly, this lying bottle will be displayed in an animated way in the main window 46 (e.g. flashing red). Further, information may be given to the user in the information field 42 as to how the machine has reacted to this fault, for example by closing a bottle barrier and reducing the machine speed. In addition, information will be output to the user as to how to correct the fault (fault correction), in this case the information that the lying bottle 48 is to be stood up or the gap is to be closed. By means of the actuation fields 43a and 43b, longer error messages may be shown or repeated.

In the main window 46, the respective operating condition of the machine is shown in real time, this operating condition corresponding to the error messages in the communication window 41 and the information field 42.

For the correction of faults or for carrying out maintenance work, the 3-D models are coupled with the real control (e.g. Simatic Step 7, Allen Bradley and B&R). In the case of a fault, the location of the fault is indicated in the 3-D model or the general machine overview. Preferably, the faulty component is highlighted, for example by flashing red. The user may then improve his/her view by zooming the machine in (animating it). To this end, respectively appropriate camera sequences in the form of flow data are stored on the storage device. This functionality, too, has to be deposited on the current visualisation system, e.g. on the touch panel.

Depending on the complexity and the type of faults, the individual measures for fault correction are also visualised, like with a product change, in an animated way, and the user may initiate this visualisation by activating a function within the touch panel. The fault correction measures mentioned above in the form of 3-D animations will give the user a quick indication as to how to correct the fault. In the case of some particularly product-relevant faults (for example 10 to 15), this is preferably realised by way of examples. This functionality, too, will be realised on the visualisation system mentioned above.

In the same way, a display may be made if individual condition detection devices 6 (FIG. 1) don't work properly. In this case, a message may appear in the communication window 41 saying that a certain sensor, for example a gripper monitor, has failed. In addition, the exact location of this sensor may be indicated. In the bottom information field 42, a more accurate description of the sensor fault may be given and for example the information may be displayed that a particular light barrier is not functioning properly. In addition, any consequences may be output, for example the information that the machine has been stopped. In addition, a recommendation may be given to the user as to how to correct the fault, for example the request to clean the sensor concerned.

This procedure constitutes a considerable improvement over the prior art, since now structured fault messages are output which on the one hand enhance the comprehensibility and on the other hand ensure completeness of the information.

Summarising, the display device may be used to provide a virtual or completely simulated virtual machine and the flow of the machine may be indicated even with a low storage capacity need.

Summarising, the device 1 according to the invention uses a three-dimensional model of the complete manipulation unit 4 including all the details a user may need. In doing so, this 3-D model requires comparatively small file sizes, e.g. file sizes of less than 2 MB. For product change processes, animations will be made available for each individual product change, whilst meaningful descriptions including the necessary tools will be indicated to the user. In addition, the individual animations may be repeated for the user.

In the case of fault messages, not only the fault message but also the exact fault location as well as an animated guide for correcting the fault will be given. In this respect, also a camera perspective depending on the display situation is possible.

All of the features disclosed in the application materials are claimed as being essential to the invention in as far as they are novel compared to the prior art either individually or in combination.

The invention claimed is:

1. A device for manipulating containers, comprising a manipulation unit manipulating the containers in a predetermined manner, this manipulation unit including at least one condition detection unit which detects at least one operating condition of the manipulation unit and sends out condition signals which are characteristic for this operating condition of the manipulation unit, and including a monitoring unit for controlling or operating the manipulation unit, the monitoring unit including a visual display device for displaying information as well as a storage device in which presentation data for components of the manipulation unit and/or of the device are deposited, wherein the monitoring unit includes an image manipulation unit which as a response to emitted condition signals provides image sequences on the basis of presentation data deposited on the storage device, which image sequences may be output via the display device, wherein the image sequences are instructions for reaching a required condition of the device, which base on an actual condition of the device.

2. The device as claimed in claim 1, wherein the presentation data is deposited on the storage device in the form of vector graphics and/or of flow data.

3. The device as claimed in claim 1, wherein images of the components and/or of the device are deposited on the storage device in a simplified form, whilst any partial areas of the component, which are irrelevant to a user, are omitted.

4. The device as claimed in claim 1, wherein using the image manipulation unit, image sequences may be generated from the presentation data deposited on the storage device.

5. The device as claimed in claim 1, wherein a plurality of condition detection units is provided.

6. The device as claimed in claim 1, wherein the operating conditions are selected from the group consisting of a fault condition, a product change condition, a fault condition of the condition detection units, an actual condition, an operating time, a maintenance condition, and a production figure.

7. The device as claimed in claim 1, wherein operating conditions of the manipulation unit are stored on a storage device.

8. A monitoring unit, for controlling and/or operating a device as claimed in claim 1, wherein the monitoring unit includes an image manipulation unit which generates image sequences on the basis of presentation data deposited on the storage device, which image sequences may be output via the display device.

9. The monitoring unit as claimed in claim 8, wherein the image sequences may be output on the basis of an actual condition of the device.

10. A method for operating a device for manipulating containers, including the following steps:
    sending out a characteristic signal to a monitoring unit of the device;
    selecting a given presentation data set from a plurality of presentation data sets deposited on a storage device, the presentation data being characteristic for at least one component and/or the device and the selection being carried out as a response to the characteristic signal;
    outputting an image sequence as a response to the characteristic signal and on the basis of the selected presentation data set, wherein the image sequences are instructions for reaching a required condition of the device, which base on an actual condition of the device.

11. The method as claimed in claim 10, wherein the characteristic signal is a signal which is characteristic for an operating condition of the device.

12. The method as claimed in claim 10, wherein the image sequence is output in a 3-D presentation.

13. The method as claimed in claim 10, wherein any instructions already carried out are forwarded to a higher-level system and are saved.

14. The method as claimed in claim 10, wherein text information is output to a user.

* * * * *